UNITED STATES PATENT OFFICE.

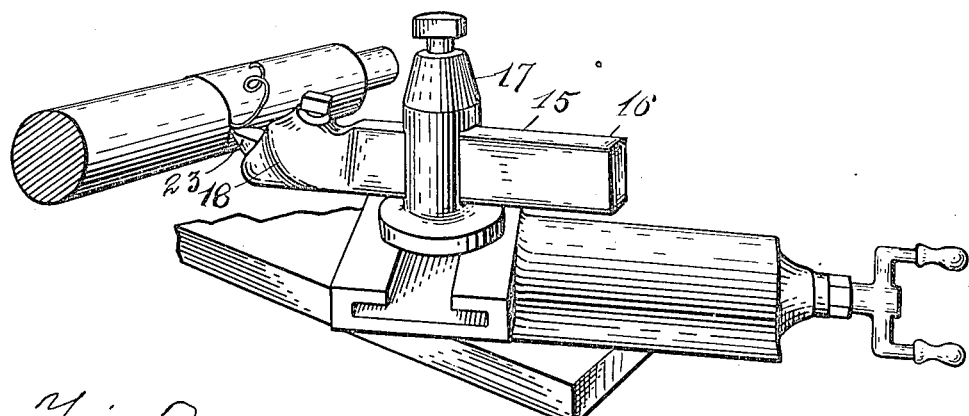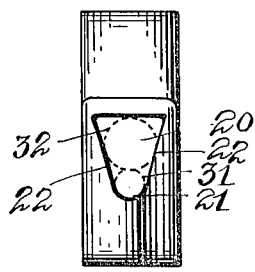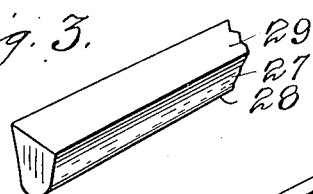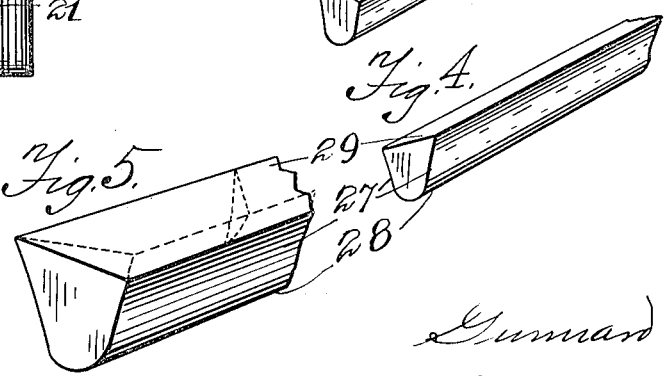

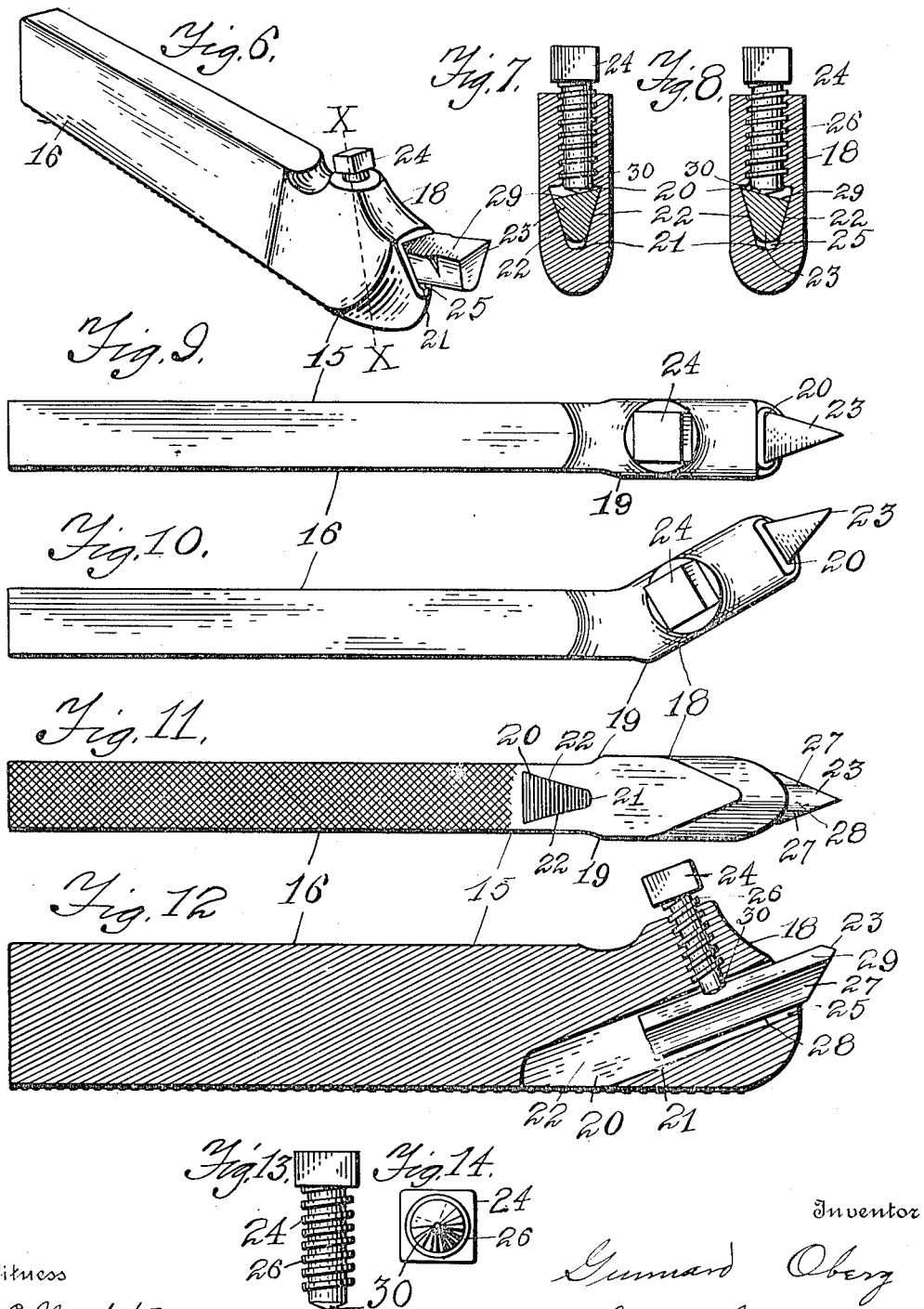

GUNNARD OBERG, OF JAMESTOWN, NEW YORK, ASSIGNOR OF ONE-HALF TO EMIL C. FELDT, OF JAMESTOWN, NEW YORK.

COMBINED TOOL AND HOLDER.

1,256,359.   Specification of Letters Patent.   Patented Feb. 12, 1918.

Application filed May 25, 1917. Serial No. 171,014.

*To all whom it may concern:*

Be it known that I, GUNNARD OBERG, a subject of the King of Sweden, residing at the city of Jamestown, in the county of Chautauqua and State of New York, have invented certain new and useful Improvements in Combined Tools and Holders, of which the following, taken in connection with the accompanying drawings, is a specification.

The invention relates to metal cutting tools for machinists and the tool-holder for the same; and the object of the improvement is to provide, first, a tool made with sides that incline downwardly toward each other and a top side which inclines to right or left according as it is desired to make a right or left shearing cut; and second, to provide a simple and strong tool-holder having a substantially triangular shaped opening therein with inwardly curved sides which wedgingly hold said tool when pressed into said sides by suitable screws: and the invention consists in the novel features and combinations hereinafter set forth and claimed.

In the drawings. Figure 1 is a perspective view of the tool-holder and tool in position in the adjusting post of a machine lathe making a cut. Fig. 2 is a front end view of the tool-holder showing the triangular-shaped opening in the same and the manner of cutting said opening. Figs. 3 and 4 show perspective views of the right and left tool bars in the preferred shape for the same;
and Fig. 5 is a similar perspective view showing in dotted line the saving of the high priced high speed steel by the inclined upper face of said tool. Fig. 6 is a perspective view of the tool-holder with the improved design of tool therein showing the small portion cut away to sharpen the tool for a shearing cut, thus effecting a saving both in time and material. Figs. 7 and 8 are sectional views at line X—X in Fig. 6 showing the right and left inclined tools in the wedging openings in the tool-holders and the peculiar formation of the lower end of the set screw for holding said tools. Fig. 9 is a top plan view of the straight form of tool-holder with the tool therein: and Fig. 10 is a similar view of a tool-holder having a sidewise bend therein. Fig. 11 is a plan view of the underside of the straight tool-holder showing the hole for the tool and the tool in the upper end of the same, also showing the preferred form of the end of the holder in its relation to the tool point. Fig. 12 is a lengthwise sectional view of the holder with the tool fastened therein by the set-screw. Fig. 13 is a side elevation of the set-screw; and Fig. 14 is an elevation of the set-screw lower end showing the conical shape of the same.

Like characters of reference refer to corresponding parts in the several views.

The numeral 15 designates the tool-holder which has a shank 16 suitable for attachment in the post 17 of a machinist's lathe or planer, being knurled on its under side.

The tool holding head 18 of the holder is thickened as shown at 19 so as to give added strength to the tool-holder shaft around the substantially triangular shaped hole 20, which hole is preferably made at an angle of incline. as shown in Fig. 12, as it extends through the head 18 of the tool holder 15.

A hole 20 is made in the peculiar triangular U-shape, with the opposite inner downwardly inclined walls 22 curved slightly inward, particularly through their central portions so as to pinch on the sides of the substantially triangular shape tool 23 when said tool is forced between the curved walls 22 by the set-screw 24.

The bottom 21 of the opening 20 extends below the lower edge or corner 28 of the tool 23 leaving a space 25 so that the tool 23 never bottoms in the hole 20 but will always be pressed against the curved sides 22. The upper portion of the hole 20 is sufficiently large to permit the tool being loosened when the set screw 24 is withdrawn therefrom so that the tool 23 may be slipped into and out of the hole 20. The extension of the hole 20 entirely through the head 18 of the tool-holder 15 permits a rod or punch being inserted from the underside to press out the tool 23 when it sticks in the hole 20.

The set-screw 24 is provided in the enlarged portion of the head 18 to key or wedge the tool 23 in the tool hole 20 from the upper side, said head 18 being built up around the set-screw 24 to firmly support the same. The set-screw 24 is also preferably made with square threads 26 for added strength and firmness in holding the tool 23.

The tool 23 is shaped as shown in Figs. 3 and 4 and in cross section in Figs. 7 and 8 with sides 27 which have a downward inclination toward each other, and a rounded or cylindrical lower edge 28 thereby giving great strength to the tool by its shape and at the same time providing a tool which wedgingly holds between the inwardly curved sides 22. As is well known machinists prefer a shearing cut for the tool in order that it may attain its highest efficiency. For this purpose the common square upper face of a tool is cut away very much as shown in dotted outline in Fig. 5, taking the time of the machinist in grinding the tool and wasting a considerable portion of said tool which is especially valuable at the present time, high speed steels ranging in price from five to eleven dollars per pound. Accordingly the bars of my improved form of tool are shaped with right or left downwardly inclined upper faces 29 according as it is desired to cut either to the right or to the left with a shearing cut and the U or broad V-shaped downwardly inclined sides of the tool 23 also present a large saving as is clearly illustrated in the sharpened tool 23 in the holder 15 in Fig. 6, the upper face of said tool being inclined to the left to thereby give a shearing cut to the end of said tool. It is apparent that whether the square, pointed or round end cut is desired for the tools the same may be attained by my improved shape of tool bar more quickly and easily and with minimum amount of waste.

The lower end 30 of the set screw 24 is made conical or pointed preferably at the angle of inclination of the top of the tool 23. This shape of the lower end 30 presents a continuous bearing surface for pressure of the set-screw 24 upon the upper portion of the inclined face 29 whether right or left thereby exerting the pressure of the set-screw 24 more on one side of the tool 23 causing said tool to bind more firmly into position between the inclined sides 22 of the hole 20.

The lower edge or corner 28 of the tool 23 is rounded and made sufficiently broad to strengthen this lower corner 28 of the tool against the heavy strains in cutting and at the same time to aid in sharpening the tool.

It is obvious that the peculiar form of the tool 23 and the hole 20 greatly aid in holding the tool solidly in the tool holder 15 since the tool is held firmly on all sides in the enlarged head 18 thereby preventing it from breaking as easily as when rigidly supported. The tool opening or hole 20 is made in its peculiar triangular form by drilling a small drill hole 31 which forms the bottom of the U-shaped lower portion of said opening 20 and then drilling a second and larger hole 32 immediately above the hole 31, broaching the upper corners and shaping the sides 22 so as to curve inward slightly, as shown in Fig. 2, the drill holes 31 and 32 extending substantially through the head 21 as shown in lengthwise section in Fig. 12.

It is also found that this peculiar form of tool bar 23 does not split in retempering on account of the better division of the stress in stock which is substantially three-cornered as compared with the four-cornered tool stock which has been commonly used heretofore.

I claim as new:—

1. In combination with a tool holder, a reversible tool for left or right cuts having its upper face inclined transversely to its longitudinal axis, and a set screw borne by the holder and having its end of conical form so as to have points diametrically opposite to each other to correspond to and conformably engage said inclined upper face of the tool in either right or left disposition thereof and to have the same relation to the tool in all dispositions thereof.

2. In combination with a tool holder having an opening with side walls, a tool in said opening having its upper face inclined transversely to its longitudinal axis, and means borne by the holder and located above the tool and engaging the high side only of the upper face of the tool to hold same in position and against each of the side walls of said opening.

3. A tool holder having a substantially triangular shaped opening therethrough for a similarly shaped tool, a set screw inserted in said holder and projecting into the upper portion of said opening, and the walls of the downwardly inclined sides of said opening curved toward each other to wedgingly receive the inclined sides of the cutting tool thereagainst by pressure from said set screw.

4. A tool holder comprising a shaft having a substantially triangular shaped opening therethrough at an incline, the downwardly inclined side walls of said opening curved slightly inwardly, a substantially triangular shaped cutting tool having an inclined upper face, and a set screw to force said tool into said substantially triangular shaped opening by pressure upon said inclined face to hold said tool on all three sides without bottoming at the lower corner.

5. A cutting tool and holder comprising a shaft having one end enlarged, the under side of the shaft of said tool-holder knurled to better hold the same, said enlarged end of said shaft having a substantially triangular shaped opening therethrough at an incline, a set-screw inserted through the enlarged end of said holder from the upper side in said triangular shaped opening, said set screw having a conical shaped end, in combination with a substantially triangular cutting tool having a shortened lower corner and an inclined upper face to press said tool into said triangular shaped opening by said set-screw to hold the same on all three sides without bottoming.

6. In a cutting tool, a holder having an opening formed with converging side walls which have confronting convex faces, a cutting tool proper of substantially triangular cross-section engaged with said respective convex faces of the holder side walls, and means for securing the tool in the holder, said tool being shaped to leave space between same and the bottom of the holder opening.

7. In combination with a tool holder a cutting tool for lathes and the like including a bar of substantially triangular cross section, the top of which has a flat surface inclined uninterruptedly from one side to the other of the bar in the direction of the cut to be effected, said surface also affording a face to engage the tool securing means, and securing means for the tool engageable in both right and left disposition of the tool with the inclined top surface thereof and without altering the position of said securing means.

In testimony whereof I have affixed my signature in the presence of two witnesses.

GUNNARD OBERG.

Witnesses:
   I. E. NORDSTROM,
   H. A. SANDBERG.